Sept. 16, 1958  H. W. HULTS  2,852,291
SEALS FOR ELECTRIC SWITCHES
Filed March 29, 1954
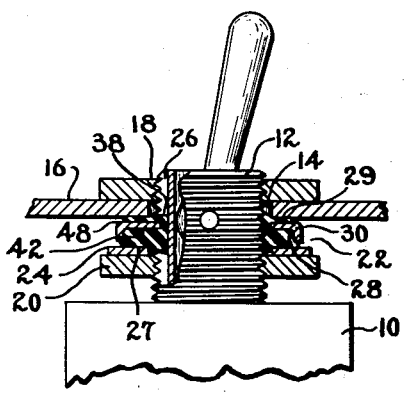
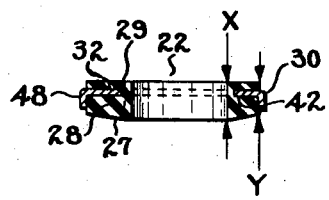
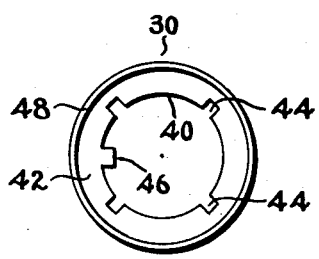
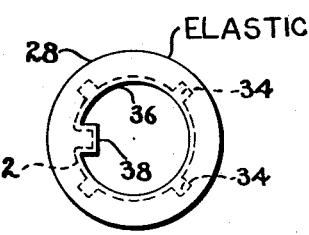
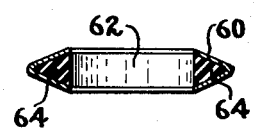
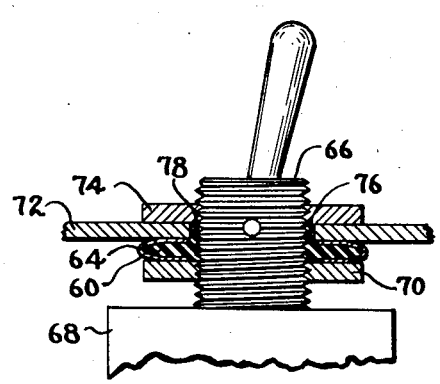
Inventor
Harold W. Hults
By Grover C. Frater
Attorney

United States Patent Office 2,852,291
Patented Sept. 16, 1958

2,852,291

SEALS FOR ELECTRIC SWITCHES

Harold W. Hults, Milwaukee, Wis., assignor to Cutler-Hammer, Inc., Milwaukee, Wis., a corporation of Delaware Application March 29, 1954, Serial No. 419,457

2 Claims. (Cl. 288—26)

This invention relates to improvements in seals for electric switches. While not limited thereto, the invention particularly relates to devices for sealing electric switches in panel openings to prevent the passage of foreign matter through the opening past the switch.

An object of the invention is to provide improved seals for electric switches and switch mounting openings.

Another object of the invention is to provide seals which provide improved sealing action, are not likely to be damaged during installation, resist relative movement between the switch and its mounting, and which can be mass produced at a reasonable cost.

Other objects and advantages of the invention will hereinafter appear.

Certain embodiments of the invention are shown in the accompanying drawings, it being understood that certain modifications may be made in the embodiments illustrated, and that other embodiments of the invention are possible, without departing from the spirit of the invention or the scope of the appended claims.

In the drawings,

Figure 1 is a cross-sectional view of a seal embodying the invention in assembled relation between a switch panel, a switch and various mounting parts which are shown fragmented and partly in elevation and partly in section.

Fig. 2 is a cross-sectional view of the seal of Fig. 1 shown in relaxed condition.

Fig. 3 is a bottom plan view of a metal die-formed cup member which forms a part of the seal of Figs. 1 and 2.

Fig. 4 is a plan view of the elastic rubber sealing annulus which forms a part of the seal of Figs. 1 and 2.

Fig. 5 is a cross-sectional view of an alternative form of seal embodying the invention shown in assembled relation between a switch panel and certain switch members which are shown fragmented and partly in elevation and partly in section; and Fig. 6 is a cross-sectional view of the seal of Fig. 5 shown in relaxed condition.

In Fig. 1, the numeral 10 designates a switch having an externally threaded mounting bushing 12 which is disposed in a mounting opening 14 of a switch panel 16. The switch is secured to the panel by nuts 18 and 20. A seal 22 and a washer 24 are interposed between panel 16 and nut 20. The seal is compressed between panel 16 and washer 24, and portions of the bushing 12 are cut away to show clearly how the seal fits within the keyway 26 with which switches of this type are usually provided.

The seal 22 comprises an elastic rubber sealing annulus 28 (see Fig. 4) and a die-formed metal cup 30 (see Fig. 3). The sealing annulus 28 is substantially trapezoidal in cross-section with the inner lateral dimension X somewhat greater than the outer lateral dimension Y (see Fig. 2), and it is provided with a groove 32 formed in its outer peripheral surface. Spaced about the circumference of and extending radially outward from the substantially circular inner extremity of groove 32 are a number of integral ribs 34 (Fig. 4) which bridge the upper and lower portions of the rubber sealing annulus 28. The central bore 36 of the annulus 28 accommodates with a press fit the externally threaded switch bushing 12. A hollow boss 38 formed integrally with annulus 28 and extending into the bore 36 is adapted to fit snugly within the keyway 26 of the bushing 12.

The cup 30, as best illustrated in Fig. 3, is formed with an opening 40 in the flat wall 42 thereof. Cut-outs 44 and key tab 46 extend radially from and into opening 40, respectively. Cut-outs 44 and tab 46 are respectively positioned to accommodate said integral ribs 34 in annulus 28 and to fit within the hollow of boss 38 of said annulus when the cup 30 is assembled with respect thereto. As shown in Figs. 1 and 2, the wall 42 of the cup 30 is disposed within groove 32 of the annulus so that the cylindrical wall 48 thereof extends downwardly to form a retaining ring for the lower portion 27 of the annulus 28. The upper portion 29 of said annulus is rectangular in cross-section and is thinner than the lower portion 27 thereof.

Referring to Fig. 1, the upper portion 29 of the annulus 28 abuts the under side of a panel 16, said boss 38 fits into said keyway or groove 26 and the inwardly and downwardly angled lower surface of the seal is compressed against washer 24. The cylindrical wall 48 of the metal cup 30 prevents the outer dimension of the lower portion 27 of the annulus from substantially increasing radially when the seal is compressed, so that the surface of the bore 36 and the boss 38 of the annulus 28 are forced into sealing engagement with the peripheral thread and the keyway 26, respectively, of the bushing 12.

The upper portion 29 of the sealing annulus is free to increase both its inner and its outer dimensions in the radial plane of said annulus when the latter is compressed. Thus it is insured that said upper portion 29 is compressed with equal force over the entire area of its engagement with the under surface of panel 16 and the upper surface of the wall 42 of cup 30. Uniform sealing of the annulus against the panel results, and the possibility of relative oscillatory movement between the panel and the switch by working of elastic parts of the seal is substantially prevented. This feature is considered to be especially important in seals for military aircraft switches. The bottom surface of the wall 42 of the cup 30 serves to make the seal relatively rigid in both the axial and the lateral direction, but it permits advantage to be taken of the compressibility of the sealing annulus in the radial plane thereof. The cylindrical wall 48 of the cup 30, as hereinbefore described, acts to confine the lower portion 27 of the annulus 28 against expansion in the radial plane.

Cut-outs 44 of said cup cooperate with ribs 34 of the annulus to prevent the latter from being forced out of shape and thus affecting its sealing action when the switch and seal are assembled on the panel. Thus it makes little difference whether the switch is secured in place by turning nut 18 or nut 20. Even the switch itself may be turned somewhat relatively to the panel without disturbing the seal.

The alternative form of seal illustrated in Figs. 5 and 6 comprises a ring 60 of relatively soft metal which, as shown in Fig. 6, is V-shaped in cross-section before the seal is compressed. The ring 60 is provided with a central bore 62 of size to accommodate the externally threaded bushing of a switch. The ring 60 is filled with a rubber-like material to form an elastic annulus 64 of triangular cross-section, as shown.

The seal is shown in Fig. 5 assembled on the externally threaded bushing 66 of a switch 68 between a nut 70 and a panel 72 through which the bushing 66 extends and to which it is held by a nut 74. The mounting opening 76 in panel 72 is larger than the outer diameter of the bushing 66. When the seal is compressed the ring 60 is partially collapsed, the outer dimension of the ring 60 remains unchanged and the annulus 64 is squeezed inwardly to seal in the threads (and the keyway, if any) of the bushing 66. Enough of the material of annulus 64 is forced upwardly, as at 78, into the mounting opening 76 between the bushing 66 and the panel 72 so that large areas of the upper and lower walls of the ring 60 are permitted to be alined in parallel relationship between the lower surface of panel 72 and the upper surface of nut 70. The metal of ring 60 is sufficiently soft so that it deforms as required to seal with the lower surface of panel 72.

I claim:

1. An annular sealing device for an electric switch, said device to be disposed upon the externally threaded mounting bushing of a one-hole mounted switch intermediate a plurality of internally threaded members adapted to mount the switch, comprising an elastic rubber sealing annulus having a central bore to accommodate and grip the switch bushing, said sealing annulus having an annular groove formed in its outer peripheral edge, a die-formed sheet metal retaining cup having a central opening formed in the end wall thereof, the end wall of said cup being disposed within said annular peripheral groove in said annulus and the peripheral wall of the cup encompassing a portion of said annulus on one side only of said annular groove, whereby upon being assembled on said bushing and compressed between said members said annulus on one side of said annular groove is confined against expansion such as would increase its outer dimension and is pressed into sealing engagement with said bushing, said portion of said annulus on the other side of said annular groove being free to be compressed to increase both its inner and its outer dimensions, whereby multiple sealing of said parts is insured, said end wall of said sheet metal cup being provided with circularly spaced cut-outs and said sealing annulus having integrally formed spaced portions disposed within said cut-outs and bridging the portions of the annulus disposed within and without said cup, whereby relative rotational movement between the cup and the sealing annulus is prevented.

2. An annular sealing device of the character defined in claim 1, wherein said sealing annulus is further provided with an integrally formed boss portion extending into the bore of said annulus for accommodation thereof in sealing engagement with the walls of a longitudinally extending keyway in said switch bushing.

References Cited in the file of this patent

UNITED STATES PATENTS

| | | |
|---|---|---|
| 271,365 | Rodney | Jan. 30, 1883 |
| 1,189,268 | Levedahl | July 4, 1916 |
| 1,333,495 | Kilpatrick et al. | Mar. 9, 1920 |
| 1,356,873 | Monteath | Oct. 26, 1920 |
| 1,364,814 | Saucke | Jan. 4, 1921 |
| 2,199,647 | Mueller et al. | May 7, 1940 |
| 2,345,515 | Tweedale | Mar. 28, 1944 |
| 2,462,023 | Johanson et al. | Feb. 15, 1949 |
| 2,503,169 | Phillips | Apr. 4, 1950 |